United States Patent
Muroyama

(10) Patent No.: US 11,113,003 B2
(45) Date of Patent: Sep. 7, 2021

(54) STORAGE APPARATUS, STORAGE CONTROL DEVICE, AND RECORDING MEDIUM WITH EXECUTION COMMAND PAUSING OR STOPPING

(71) Applicant: FUJITSU LIMITED, Kawasaki (JP)

(72) Inventor: Tomohiko Muroyama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 12 days.

(21) Appl. No.: 16/720,815

(22) Filed: Dec. 19, 2019

(65) Prior Publication Data
US 2020/0218472 A1    Jul. 9, 2020

(30) Foreign Application Priority Data

Jan. 8, 2019   (JP) ............................. JP2019-001235

(51) Int. Cl.
*G06F 3/06*      (2006.01)
*G06F 9/48*      (2006.01)

(52) U.S. Cl.
CPC .......... *G06F 3/0659* (2013.01); *G06F 3/0604* (2013.01); *G06F 3/0679* (2013.01); *G06F 9/4881* (2013.01)

(58) Field of Classification Search
CPC .... G06F 3/0604; G06F 3/0611; G06F 3/0659; G06F 3/0679; G06F 3/0689; G06F 9/4881; G06F 9/541
See application file for complete search history.

(56) References Cited

U.S. PATENT DOCUMENTS

| | | | |
|---|---|---|---|
| 8,694,724 B1* | 4/2014 | Linnell | G06F 12/0866 711/114 |
| 2003/0233611 A1* | 12/2003 | Humlicek | G06F 11/1092 714/763 |
| 2006/0277328 A1* | 12/2006 | Cherian | G06F 3/0607 710/36 |
| 2009/0292873 A1 | 11/2009 | Aono et al. | |
| 2017/0139698 A1* | 5/2017 | Muroyama | G06F 9/45508 |
| 2018/0275875 A1* | 9/2018 | Yonezawa | G06F 12/0246 |

FOREIGN PATENT DOCUMENTS

| | | |
|---|---|---|
| JP | 2009-282834 A | 12/2009 |
| WO | 2017/056208 A1 | 4/2017 |

* cited by examiner

*Primary Examiner* — Larry T Mackall
(74) *Attorney, Agent, or Firm* — Fujitsu Patent Center

(57) ABSTRACT

A storage apparatus includes a non-volatile storage device configured to store data; a memory; and a processor coupled to the memory and configured to control access to the non-volatile storage device, the processor configured to: receive an instruction from external software as a task, generate a command set for controlling the non-volatile storage device, execute a command included in the generated command set, control firmware revision processing of the storage apparatus, and stop execution of the command after performing processing for suppressing abnormality detection of the external software at a timing at which the command is not executable during the firmware revision processing.

7 Claims, 16 Drawing Sheets

FIG. 4

| STATUS OF TASK | DETAILS |
|---|---|
| Queued | TASK INFORMATION IS QUEUED AND IS IN PRE-EXECUTION STATE |
| Running | TASK HAS STARTED AND COMMAND EXECUTION HAS STARTED |
| Success | ALL COMMANDS OF TASK ASSOCIATED WITH API HAVE ENDED NORMALLY |
| Error | COMMAND OF TASK ASSOCIATED WITH API HAS ENDED ABNORMALLY |

FIG. 5

| WITH/WITHOUT TIMEOUT REQUIREMENT | STATUS OF TASK | DETAILS OF PAUSE OPERATION |
|---|---|---|
| WITH TIMEOUT REQUIREMENT | Queued | PERFORM PROCESSING UNTIL STATUS OF TASK IS DETERMINED TO BE "Success" OR "Error" (COMMAND SWEEPING PROCESSING) |
| | Running | PERFORM PROCESSING UNTIL STATUS OF TASK IS DETERMINED TO BE "Success" OR "Error" (COMMAND SWEEPING PROCESSING) |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |
| WITHOUT TIMEOUT REQUIREMENT | Queued | MAINTAIN "Queued" |
| | Running | STOP PROCESSING UPON RECEIVING COMMAND RESPONSE |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |

FIG. 6

| WITH/WITHOUT TIMEOUT REQUIREMENT | STATUS OF TASK | DETAILS OF PAUSE OPERATION |
|---|---|---|
| WITH TIMEOUT REQUIREMENT | Queued | MAINTAIN "QUEUED" |
| | Running | PERFORM PROCESSING UNTIL STATUS OF TASK IS DETERMINED TO BE "Success" OR "Error" (COMMAND SWEEPING PROCESSING) |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |
| WITHOUT TIMEOUT REQUIREMENT | Queued | MAINTAIN "QUEUED" |
| | Running | STOP PROCESSING UPON RECEIVING COMMAND RESPONSE |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |

FIG. 7

| WITH/WITHOUT TIMEOUT REQUIREMENT | STATUS OF TASK | DETAILS OF COMPLETE STOP OPERATION |
|---|---|---|
| WITH TIMEOUT REQUIREMENT | Queued | PERFORM PROCESSING UNTIL STATUS OF TASK IS DETERMINED TO BE "Success" OR "Error" (COMMAND SWEEPING PROCESSING) |
| | Running | PERFORM PROCESSING UNTIL STATUS OF TASK IS DETERMINED TO BE "Success" OR "Error" (COMMAND SWEEPING PROCESSING) |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |
| WITHOUT TIMEOUT REQUIREMENT | Queued | PERFORM PROCESSING UNTIL STATUS OF TASK IS DETERMINED TO BE "Success" OR "Error" (COMMAND SWEEPING PROCESSING) |
| | Running | PERFORM PROCESSING UNTIL STATUS OF TASK IS DETERMINED TO BE "Success" OR "Error" (COMMAND SWEEPING PROCESSING) |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |

FIG. 8

| WITH/WITHOUT TIMEOUT REQUIREMENT | STATUS OF TASK | DETAILS OF COMPLETE STOP OPERATION |
|---|---|---|
| WITH TIMEOUT REQUIREMENT | Queued | MAINTAIN "Queued" |
| | Running | PERFORM PROCESSING UNTIL STATUS OF TASK IS DETERMINED TO BE "Success" OR "Error" (COMMAND SWEEPING PROCESSING) |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |
| WITHOUT TIMEOUT REQUIREMENT | Queued | PERFORM PROCESSING UNTIL STATUS OF TASK IS DETERMINED TO BE "Success" OR "Error" (COMMAND SWEEPING PROCESSING) |
| | Running | STOP PROCESSING UPON RECEIVING COMMAND RESPONSE |
| | Success | RETAIN TASK INFORMATION, AND DELETE TASK INFORMATION AFTER NOTIFICATION |
| | Error | RETAIN TASK INFORMATION, AND DELETE TASK INFORMATION AFTER NOTIFICATION |

STORAGE APPARATUS, STORAGE CONTROL DEVICE, AND RECORDING MEDIUM WITH EXECUTION COMMAND PAUSING OR STOPPING

CROSS-REFERENCE TO RELATED APPLICATION

This application is based upon and claims the benefit of priority of the prior Japanese Patent Application No. 2019-1235, filed on Jan. 8, 2019, the entire contents of which are incorporated herein by reference.

FIELD

The embodiment discussed herein is related to a storage control technology.

BACKGROUND

A firmware active application function is one of important functions of storage apparatuses. The firmware active application function revises firmware of a storage apparatus while keeping the storage apparatus online without stopping the storage apparatus.

The storage apparatus includes a plurality of modules. Each module operates with independent firmware. Each module includes two regions to which firmware is written: an operating region and a non-operating region. Upon the firmware active application, revised firmware is written to the non-operating region. After that, the non-operating region is switched to the operating region. At the time of reboot, the storage apparatus starts up with the revised firmware.

A storage control device includes two systems: a master system and another system that operates when the master system has an abnormality. The firmware is revised in one system after the other, allowing revision of the firmware while keeping the storage apparatus online.

There is a technique that monitors an access to a target storage apparatus to which firmware is applied and provides instructions to apply the firmware to the target storage apparatus based on the monitoring result. This technique enables application of the firmware even when the target storage apparatus is in operation.

Another technique improves an operability of a higher-layer program, which is operated by an user, without the user being directly aware of the operation of a lower-layer program in a system that provides a single function by calling a plurality of programs hierarchically. In this technique, when the lower-layer program receives a large number of requests, the lower-layer program identifies relationships between the timeout requirements of the requests and tasks that are the basis of the respective requests. According to the execution order of the tasks in a program that has issued the requests and the timeout requirement of each request, the lower-layer program controls the execution order of the requests so as to reduce the timeout as much as possible.

Examples of the techniques are disclosed in Japanese Laid-open Patent Publication No. 2009-282834 and International Publication Pamphlet No. WO 2017/056208.

SUMMARY

According to an aspect of the embodiment, a storage apparatus includes a non-volatile storage device configured to store data; a memory; and a processor coupled to the memory and configured to control access to the non-volatile storage device, the processor configured to: receive an instruction from external software as a task, generate a command set for controlling the non-volatile storage device, execute a command included in the generated command set, control firmware revision processing of the storage apparatus, and stop execution of the command after performing processing for suppressing abnormality detection of the external software at a timing at which the command is not executable during the firmware revision processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating status of a task managed by a command manager;

FIG. 5 is a diagram illustrating a pause operation in step 1;

FIG. 6 is a diagram illustrating a pause operation in step 2;

FIG. 7 is a diagram illustrating a complete stop operation in step 1;

FIG. 8 is a diagram illustrating a complete stop operation in step 2;

DESCRIPTION OF EMBODIMENTS

In recent years, there have been an increasing number of environments that automate operations in cloud systems or use virtualization software. In an environment that automates operations in a cloud system or uses virtualization software, software that operates on a server performs configuration control over a storage apparatus. The configuration control refers to settings of an apparatus such as redundant arrays of inexpensive disks (RAID) settings and changes of the configuration of the apparatus such as changes of the RAID configuration. In some cases, the configuration control over the storage apparatus is performed during the firmware active application.

However, the firmware active application involves reboot of a module to be revised. In order to maintain integrity of various control tables in the module between two systems, there is a timing at which the configuration control from external software is not acceptable. The external software refers to the software that operates on the server.

The technique has an issue that, when the configuration control from the external software is not acceptable, the external software detects an abnormality and the operation of a system using the external software stops. A storage control device may accept the configuration control from the user as well as from the external software.

An embodiment of a storage apparatus, a storage control device, and a storage control program disclosed in the present application will be hereinafter described in detail with reference to the drawings. The following embodiment does not limit the disclosed technology.

Figure 1:
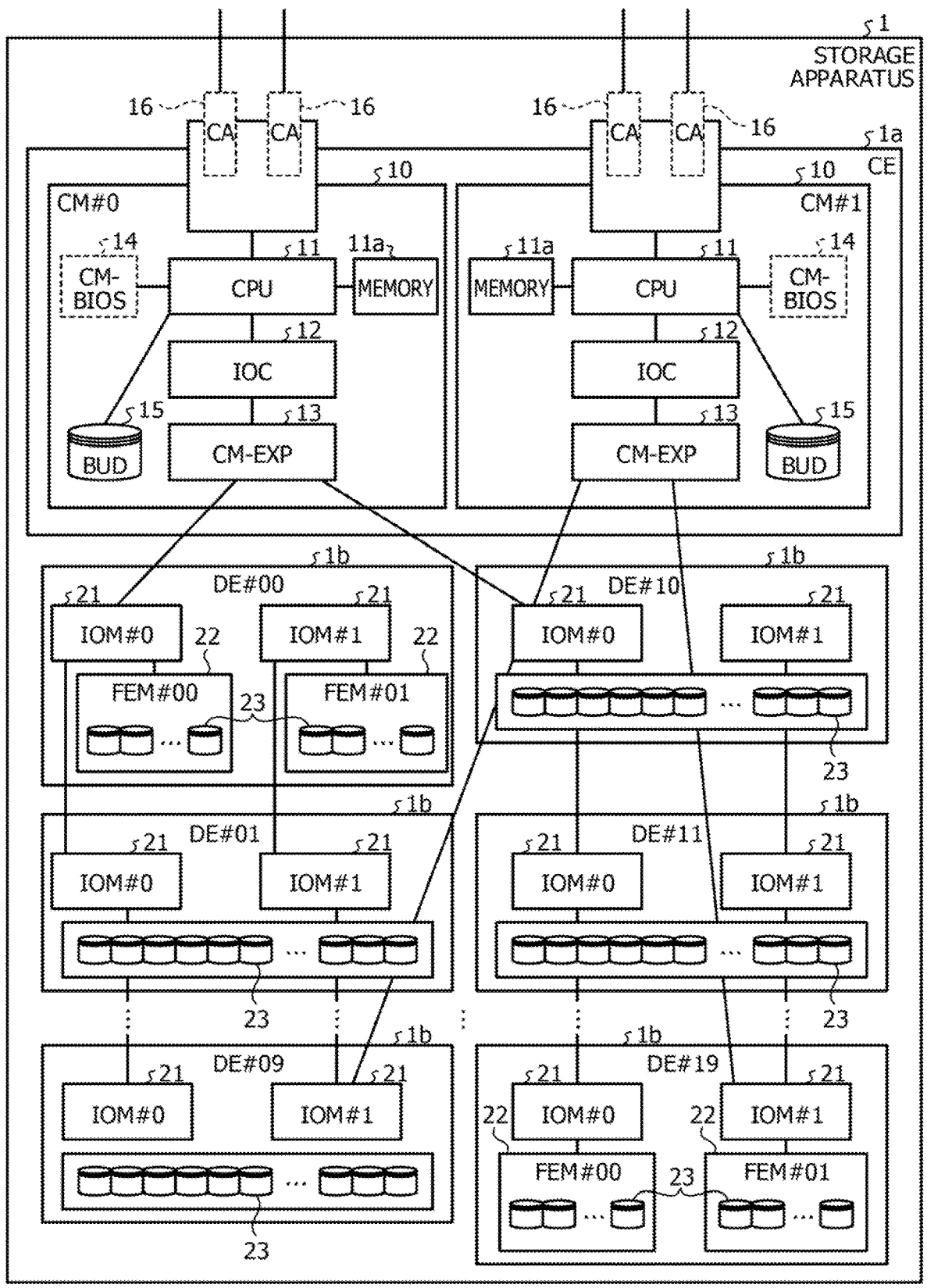
FIG. 1 is a diagram illustrating a configuration of a storage apparatus according to an embodiment.

A configuration of a storage apparatus according to an embodiment will be described. FIG. 1 is a diagram illustrating a configuration of a storage apparatus according to an embodiment. As illustrated in FIG. 1, a storage apparatus 1 according to the embodiment includes a controller enclosure (CE) 1a and twenty drive enclosures (DEs) 1b denoted as DE #00 to DE #19. The CE 1a is a housing including two controller modules (CMs) 10 denoted as CM #0 and CM #1. The DEs 1b are housings each including hard disk drives (HDDs) 23. The DEs 1b may include other non-volatile storage devices such as solid-state drives (SSDs) instead of the HDDs 23. Alternatively, the DEs 1b may include a plurality of types of non-volatile storage devices.

The CMs 10 are control devices that control the storage apparatus 1. The CM #0 and the CM #1 constitute a redundant system. One of the CM #0 and the CM #1 operates as a master. Each CM 10 includes a central processing unit (CPU) 11, a memory 11a, an input/output controller (IOC) 12, a CM-EXPander (EXP) 13, and a CM-basic input/output system (BIOS) 14. Each CM 10 also includes a bootup and utility device (BUD) 15 and two channel adapters (CAs) 16.

The CPU 11 causes the corresponding CM 10 to operate as the control device by executing firmware stored in the memory 11a. The memory 11a is a random-access memory (RAM) that stores, for example, the firmware to be executed by the CPU 11 and data to be used by the firmware. The firmware to be executed by the CPU 11 is read from a flash memory and stored in the memory 11a, for example. Alternatively, the firmware to be executed by the CPU 11 may be read from a compact disc-recordable (CD-R), which is a computer-readable medium, and stored in the memory 11a.

The IOC 12 is a serial attached SCSI (SAS) controller. The CM-EXP 13 couples the CM 10 with the DEs 1b by the SAS. The CM-BIOS 14 is a read-only memory (ROM) storing a BIOS. The BIOS starts an operating system (OS) that operates on the CPU 11. The BUD 15 stores configuration setting information regarding the storage apparatus 1, for example. Each CA 16 is an interface with an information processing apparatus such as a server. The information processing apparatus such as a server writes data to the storage apparatus 1 and reads data from the storage apparatus 1.

Each DE 1b includes I/O modules (IOMs) 21 denoted as IOM #0 and IOM #1. Each IOM 21 transfers an SAS frame to the HDD 23 specified by the corresponding CM 10. Each of the DEs 1b denoted as the DE #00 and the DE #19 includes fan expander modules (FEMs) 22 denoted as FEM #00 and FEM #01. Each of the other DEs 1b includes the plurality of HDDs 23. Each FEM 22 includes the plurality of HDDs 23 and transfers the SAS frame transferred by the corresponding IOM 21 to the HDD 23 specified by the corresponding CM 10. Each FEM 22 includes a fan and cools the DE 1b.

The storage apparatus 1 may include more or fewer DEs 1b. More or fewer DEs 1b may include the FEMs 22.

Figure 2:
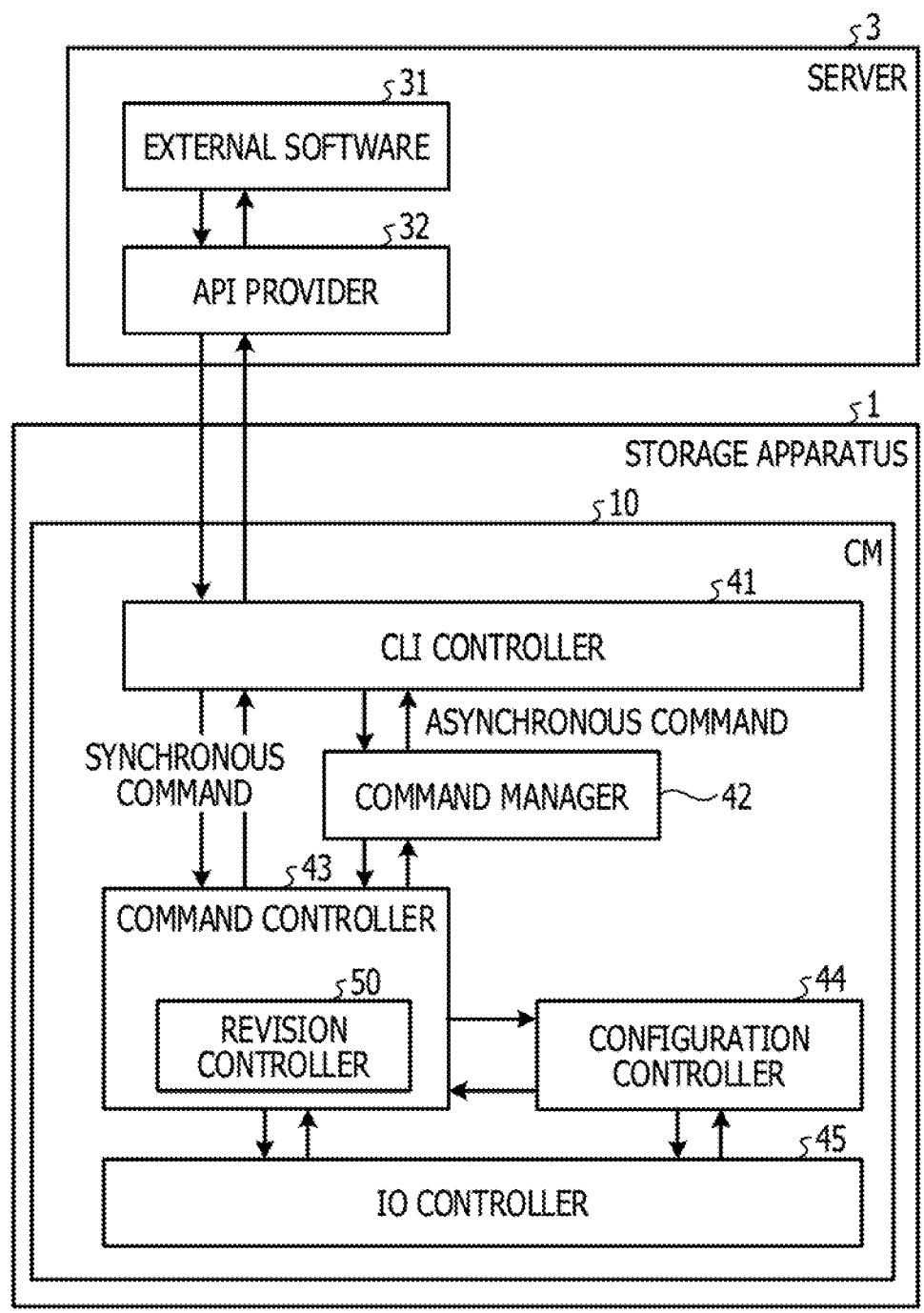
FIG. 2 is a diagram illustrating a functional configuration of a CM.

A functional configuration of CMs will be described below. FIG. 2 is a diagram illustrating a functional configuration of one of CMs. The CMs illustrated in FIG. 2 may be CMs 10 illustrated in FIG. 1. Since the two CMs 10 include a like functional configuration, the functional configuration of one of the CMs 10 is illustrated in FIG. 2. The functions of the CM 10 are implemented by the CPU 11 executing the firmware stored in the memory 11a. As illustrated in FIG. 2, the CM 10 includes a command-line interface (CLI) controller 41, a command manager 42, a command controller 43, a configuration controller 44, and an IO controller 45.

The CLI controller 41 receives a CLI command from an application programming interface (API) provider 32. When the received CLI command is a synchronous command, the CLI controller 41 passes the received CLI command to the command controller 43. When the received CLI command is an asynchronous command, the CLI controller 41 generates a corresponding command set and passes the command set to the command manager 42.

The API provider 32 is software that accepts API execution from external software 31, converts the accepted API into one or more CLI commands, and transmits the CLI command(s) to the storage apparatus 1. The external software 31 operates on a server 3. The API provider 32 receives the status and result of the execution of the CLI command(s) from the storage apparatus 1 and responds to the external software 31. Although the API provider 32 operates on the server 3 in the embodiment, the storage apparatus 1 may include the functions of the API provider 32.

The synchronous command is a command that the external software 31 expects to receive a response at the time of the API return. The asynchronous command is a command that the external software 31 checks the progress of the API execution. There are two types of commands in the asynchronous command: a command that is converted from an API having a timeout requirement; and a command that is converted from an API having no timeout requirement. The storage apparatus 1 detects a timing at which no synchronous command is being processed, and revises the firmware.

Figure 3:
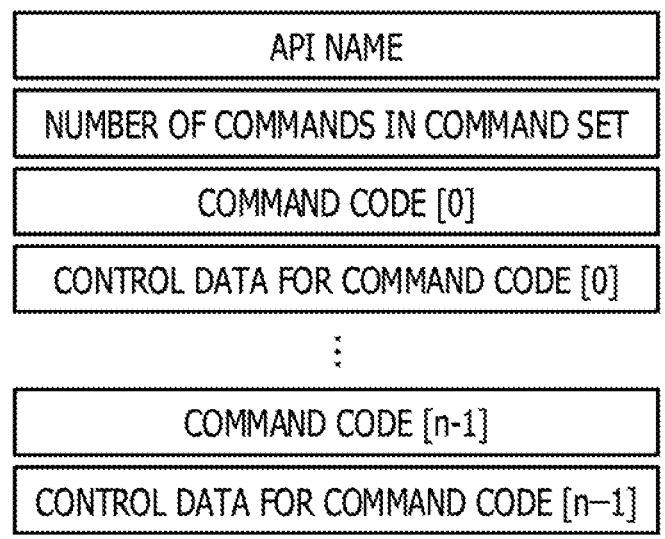
FIG. 3 is a diagram illustrating an example of a command set.

FIG. 3 is a diagram illustrating an example of a command set. As illustrated in FIG. 3, the command set includes an API name, the number of commands in the command set, and commands corresponding to the number of commands. In FIG. 3, the number of commands is denoted as "n" (a positive integer). Each command includes a command code and control data for the command code. The API name identifies the API that is the basis of the command set.

The command manager 42 passes the commands included in the command set to the command controller 43 one by one and requests the command controller 43 for execution. The command manager 42 associates an API with a task and manages task information using a queue. When the command manager 42 receives an inquiry about the progress of the API execution from the external software 31, the command manager 42 responds with the progress of the task through the CLI controller 41 and the API provider 32.

FIG. 4 is a diagram illustrating status of a task managed by a command manager. The command manager illustrated in FIG. 4 may be the command manager 42 illustrated in FIG. 2. As illustrated in FIG. 4, the status of the task includes "Queued," "Running," "Success," and "Error." "Queued" indicates that the task information is queued and the task is in a pre-execution state. "Running" indicates that the task has started and the command execution has started. "Success" indicates that all commands of the task have ended normally. "Error" indicates that the command execution of the task has failed. The task information is synchronized between the two CMs 10.

The command controller 43 executes the synchronous command received from the CLI controller 41 and the command received from the command manager 42. The command controller 43 notifies the CLI controller 41 of the execution result of the synchronous command, and notifies the command manager 42 of the execution result of the command. The command controller 43 requests the configuration controller 44 to process a command related to the configuration control. When the command controller 43 is required to access the HDD 23 at the time of the execution of the synchronous command and at the time of the execution of the command, the command controller 43 requests the IO controller 45 to perform processing. When the server 3 requests the IO controller 45 to read or write data, the IO controller 45 receives the request from the server 3 through a path different from the path illustrated in FIG. 2.

The configuration controller 44 performs the configuration control and notifies the command controller 43 of the result of the configuration control. When the configuration controller 44 is required to access the HDD 23 at the time of the configuration control, the configuration controller 44 requests the IO controller 45 to perform processing.

When the IO controller 45 receives a request for processing from the command controller 43, the IO controller 45 notifies the command controller 43 of the processing result. When the IO controller 45 receives a request for processing from the configuration controller 44, the IO controller 45 notifies the configuration controller 44 of the processing result. The IO controller 45 receives a data reading or writing request from the server 3 through the path different from the path illustrated in FIG. 2, and controls writing or reading of data to or from the HDD 23.

The command controller 43 includes a revision controller 50. The revision controller 50 controls firmware active application. During the firmware active application processing, the revision controller 50 provides a stop instruction to the command manager 42 at a timing at which the configuration control performed using the API is not acceptable.

Examples of the timing at which the configuration control is not acceptable during the firmware active application processing include: the timing of separating and incorporating the CM 10 during the firmware revision of the CM 10; and the timing of synchronizing a cache table during the firmware revision of the CM 10. Another example of the timing at which the configuration control is not acceptable during the firmware active application processing includes the timing of switching the master CM 10 serving as the master.

Before starting the separation and incorporation of the CM 10, accordingly, the revision controller 50 provides a pause instruction to the command manager 42. Before starting the synchronization of the cache table, the revision controller 50 also provides the pause instruction to the command manager 42.

When the command manager 42 receives the pause instruction, as step 1, the command manager 42 preferentially processes an API having the timeout requirement such that the external software 31 does not detect the timeout, and performs command sweeping processing before stopping. The command sweeping processing refers to processing performed until the status of the task becomes "Success" or "Error (failure)." In the case of an API having no timeout requirement, as step 1, the command manager 42 stops the processing of the next command after receiving the processing result of a command being processed.

FIG. 5 is a diagram illustrating a pause operation in step 1. As illustrated in FIG. 5, when there is the timeout requirement and the status of the task indicates "Queued" or "Running," the command manager 42 performs the command sweeping processing. The command manager 42 continues to perform the processing until the status of the task is determined to be "Success" or "Error." When there is the timeout requirement and the status of the task indicates "Success" or "Error," the command manager 42 retains the task information, and deletes the task information after notification of "success" or "failure."

When the command manager 42 receives the pause instruction, there is no timeout requirement, and the status of the task indicates "Queued," the command manager 42 maintains "Queued." For example, the command manager 42 stops the execution of the task in "Queued" status. When the command manager 42 receives the pause instruction, there is no timeout requirement, and the status of the task indicates "Running," the command manager 42 stops the processing upon receiving a command response. For example, the command manager 42 stops the execution of the next command of the task in "Running" status. When the command manager 42 receives the pause instruction, there is no timeout requirement, and the status of the task indicates "Success" or "Error," the command manager 42 retains the task information, and deletes the task information after notification of "success" or "failure."

After completion of the pause processing, the command manager 42 responds with the completion of the pause in response to the status confirmation received from the revision controller 50. When the revision controller 50 receives the completion of the pause or when the first threshold time has elapsed, the revision controller 50 starts the processing for which the revision controller 50 has provided the pause instruction. For example, when the revision controller 50 has provided the pause instruction before starting the separation and incorporation of the CM 10, the revision controller 50 starts the separation and incorporation of the CM 10. When the revision controller 50 has provided the pause instruction before starting the synchronization of the cache table, the revision controller 50 starts the synchronization of the cache table. After completion of the separation and incorporation of the CM 10 or completion of the synchronization of the cache table, the revision controller 50 instructs the command manager 42 to resume.

When the command manager 42 does not complete the pause operation in step 1 within the second threshold (<first threshold) time, the command manager 42 proceeds to step 2. FIG. 6 is a diagram illustrating a pause operation in step 2. As illustrated in FIG. 6, when there is the timeout requirement and the status of the task indicates "Queued," the command manager 42 maintains "Queued." When there is the timeout requirement and the status of the task indicates "Running," the command manager 42 performs the command sweeping processing and continues to perform the processing until the status of the task is determined to be "Success" or "Error." When there is the timeout requirement and the status of the task indicates "Success" or "Error," the command manager 42 retains the task information, and deletes the task information after notification of "success" or "failure."

When there is no timeout requirement and the status of the task indicates "Queued" in the pause operation in step 2, the command manager 42 maintains "Queued." When there is no timeout requirement and the status of the task indicates "Running" in the pause operation in step 2, the command manager 42 stops the processing upon receiving a command response. When there is no timeout requirement and the status of the task indicates "Success" or "Error" in the pause operation in step 2, the command manager 42 retains the task information, and deletes the task information after notification of "success" or "failure."

When the master CM 10 is switched, the network is once reset. Thus, the communication between the external software 31 and the master CM 10 is temporarily disconnected. After the external software 31 detects disconnection from the storage apparatus 1, the external software 31 is not able to continue the processing and detects an abnormality depending on the number of connection retries. In order to avoid the abnormality detection of the external software 31 as much as possible, the revision controller 50 provides a complete stop instruction to the command manager 42 before switching and continues the firmware revision with no queued task left.

When the command manager 42 receives the complete stop instruction, as step 1, the command manager 42 performs the command sweeping processing before stopping regardless of whether or not there is the timeout requirement.

FIG. 7 is a diagram illustrating a complete stop operation in step 1. As illustrated in FIG. 7, when the status of the task indicates "Queued" or "Running," the command manager 42 performs the command sweeping processing regardless of whether or not there is the timeout requirement. When the status of the task indicates "Success" or "Error," the command manager 42 retains the task information, and deletes the task information after notification of "success" or "failure" regardless of whether or not there is the timeout requirement.

After completion of the complete stop operation, the command manager 42 responds with the completion of the complete stop in response to the status confirmation received from the revision controller 50. When the revision controller 50 receives the completion of the complete stop or when the first threshold time has elapsed, the revision controller 50 starts switching the CM 10. After completion of the switching of the CM 10, the revision controller 50 instructs the command manager 42 to resume.

When the command manager 42 does not complete the complete stop operation in step 1 within the second threshold time, the command manager 42 proceeds to step 2. FIG. 8 is a diagram illustrating a complete stop operation in step 2. As illustrated in FIG. 8, when there is the timeout requirement and the status of the task indicates "Queued," the command manager 42 maintains "Queued." When there is the timeout requirement and the status of the task indicates "Running," the command manager 42 performs the command sweeping processing. When there is the timeout requirement and the status of the task indicates "Success" or "Error," the command manager 42 retains the task information, and deletes the task information after notification of "success" or "failure."

When there is no timeout requirement and the status of the task indicates "Queued" in the complete stop operation in step 2, the command manager 42 performs the command sweeping processing. When there is no timeout requirement and the status of the task indicates "Running" in the complete stop operation in step 2, the command manager 42 stops the processing upon receiving a command response. When there is no timeout requirement and the status of the task indicates "Success" or "Error" in the complete stop operation in step 2, the command manager 42 retains the task information, and deletes the task information after notification of "success" or "failure."

Figure 9:
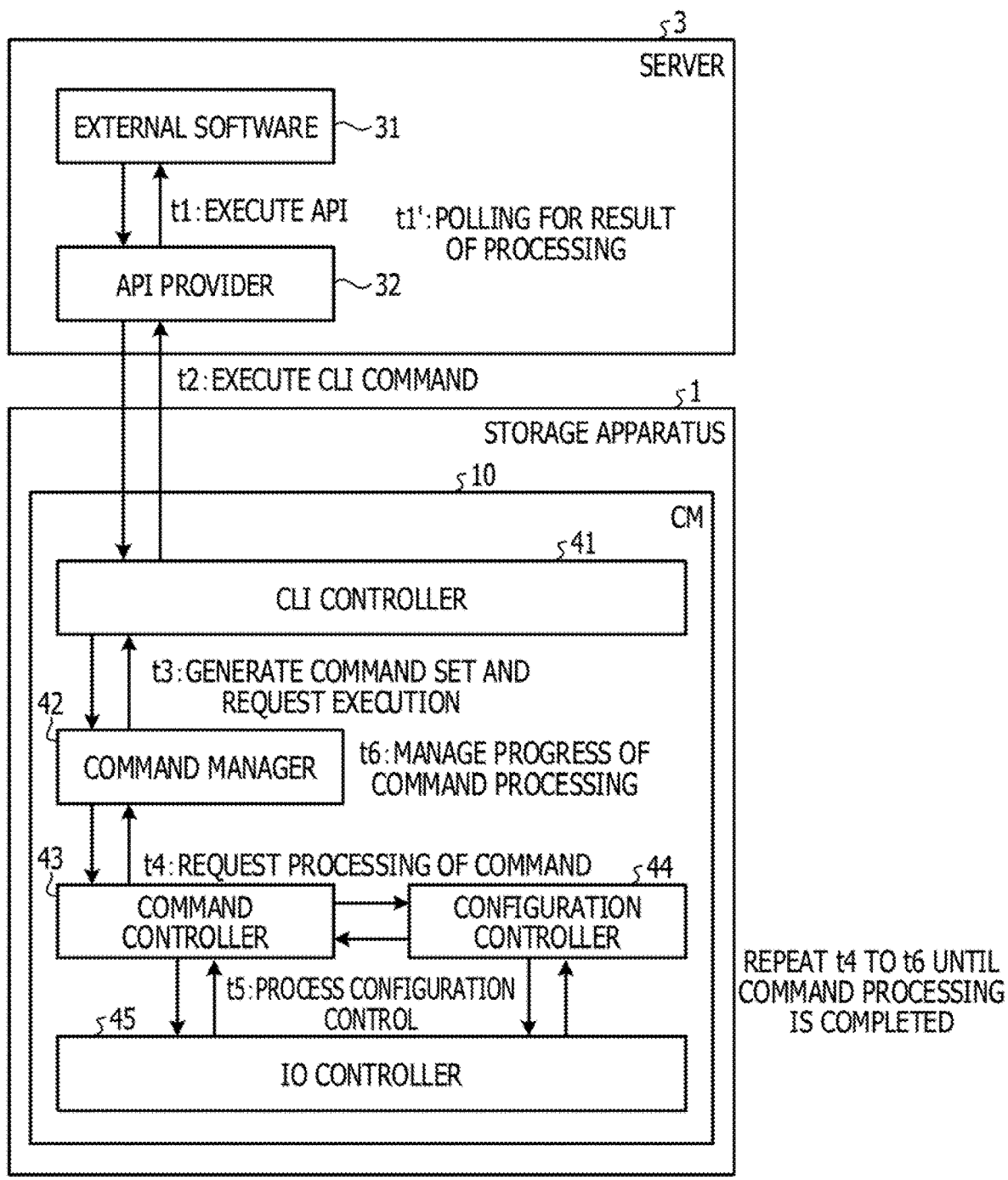
FIG. 9 is a diagram illustrating a flow of asynchronous command processing.

A flow of asynchronous command processing will be described below. FIG. 9 is a diagram illustrating a flow of asynchronous command processing. As illustrated in FIG. 9, the external software 31 executes an API (t1). The external software 31 also performs polling for the result of processing of the storage apparatus 1 regarding the executed API (t1').

The API provider 32 accepts the API execution, converts the accepted API into one or more CLI commands, and instructs the storage apparatus 1 to execute the CLI command(s) (t2). The CLI controller 41 generates a command set from an asynchronous command and requests the command manager 42 for execution (t3).

The command manager 42 extracts commands one by one from the command set and requests the command controller 43 to process the command (t4). The command controller 43 requests the configuration controller 44 to process the configuration control (t5). The command manager 42 manages the progress of the command processing (t6). When the command manager 42 receives the processing result of the requested command from the command controller 43, the command manager 42 extracts the next command from the command set and requests the command controller 43 to process the command (t4).

In this way, the processing from t4 to t6 is repeated until the command processing is completed. However, when the firmware active application is performed, the command processing may be stopped. For example, an asynchronous command having no timeout requirement is more likely to be stopped than an asynchronous command having the timeout requirement.

Figure 10:
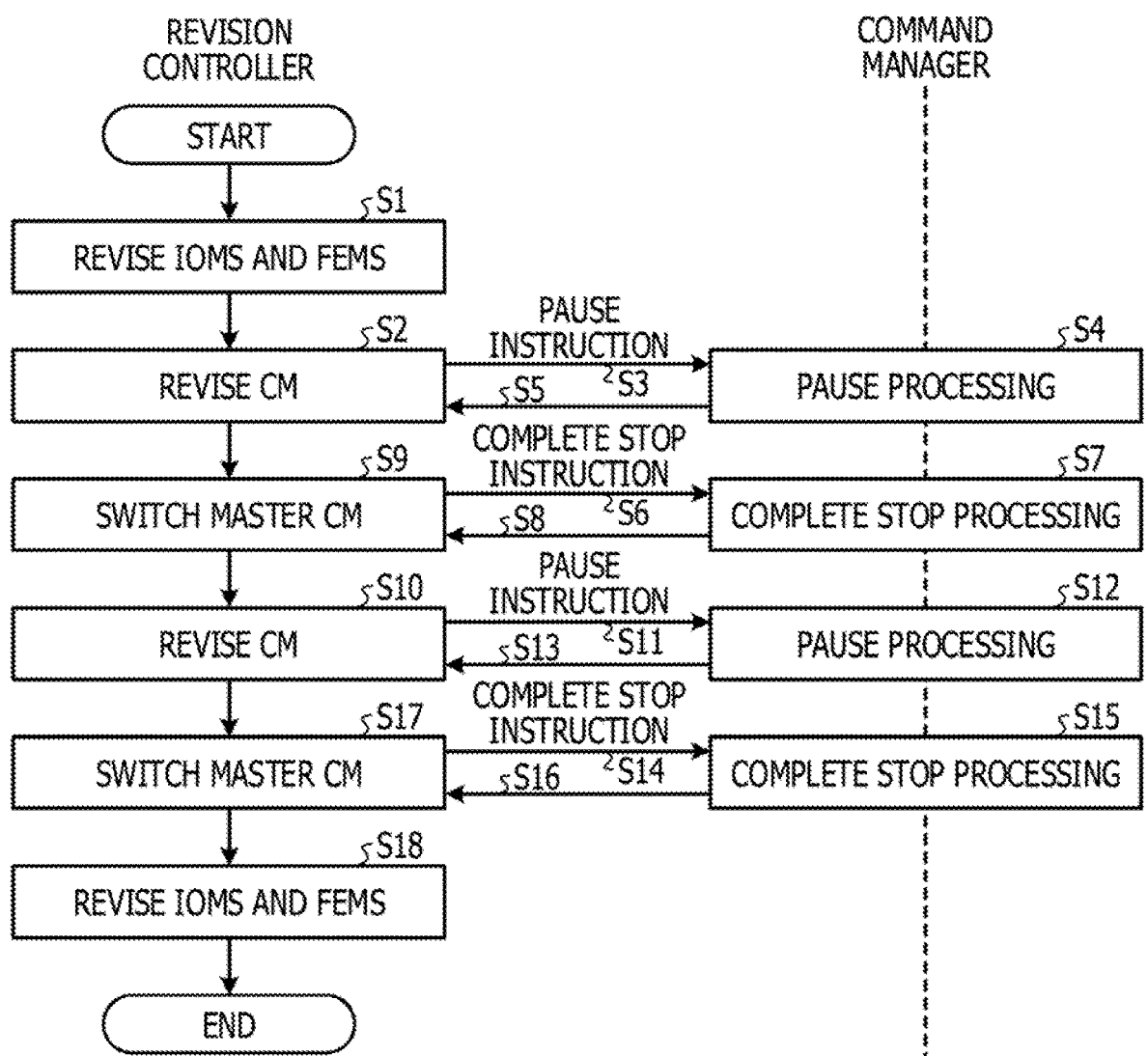
FIG. 10 is a flowchart illustrating a flow of firmware revision processing.

A flow of firmware revision processing will be described below. FIG. 10 is a flowchart illustrating a flow of firmware revision processing. "Revise" in FIG. 10 refers to the revision of the firmware. As illustrated in FIG. 10, the revision controller 50 revises the IOMs 21 and the FEMs 22 (step S1).

The revision controller 50 revises the CM 10 (step S2). The revision controller 50 provides the pause instruction to the command manager 42 at the timing of starting the separation and incorporation of the CM 10 during the revision of the CM 10 (step S3). When the command manager 42 receives the pause instruction, the command manager 42 performs the pause processing (step S4). After completion of the pause processing, the command manager 42 responds with the completion in response to the status confirmation received from the revision controller 50 (step S5). When the revision controller 50 receives the completion response from the command manager 42 or when the first threshold time has elapsed, the revision controller 50 starts the separation and incorporation of the CM 10. After completion of the separation and incorporation of the CM 10, the revision controller 50 instructs the command manager 42 to resume processing.

The revision controller 50 provides the pause instruction to the command manager 42 at the timing of starting the synchronization of the cache table (step S3). When the command manager 42 receives the pause instruction, the command manager 42 performs the pause processing (step S4). After completion of the pause processing, the command manager 42 responds with the completion in response to the status confirmation received from the revision controller 50 (step S5). When the revision controller 50 receives the completion response from the command manager 42 or when the first threshold time has elapsed, the revision controller 50 starts the synchronization of the cache table. After completion of the synchronization of the cache table, the revision controller 50 instructs the command manager 42 to resume processing.

Before switching the master CM 10, the revision controller 50 provides the complete stop instruction to the command manager 42 (step S6). When the command manager 42 receives the complete stop instruction, the command manager 42 performs the complete stop processing (step S7). After completion of the complete stop processing, the command manager 42 responds with the completion in response to the status confirmation received from the revision controller 50 (step S8). When the revision controller 50 receives the completion response from the command manager 42 or when the first threshold time has elapsed, the revision controller 50 switches the master CM 10 (step S9). After completion of the switching of the master CM 10, the revision controller 50 instructs the command manager 42 to resume processing.

The revision controller 50 revises the CM 10 (step S10). The revision controller 50 provides the pause instruction to the command manager 42 at the timing of starting the separation and incorporation of the CM 10 during the revision of the CM 10 (step S11). When the command manager 42 receives the pause instruction, the command manager 42 performs the pause processing (step S12). After completion of the pause processing, the command manager 42 responds with the completion in response to the status confirmation received from the revision controller 50 (step S13). When the revision controller 50 receives the completion response from the command manager 42 or when the first threshold time has elapsed, the revision controller 50 starts the separation and incorporation of the CM 10. After completion of the separation and incorporation of the CM 10, the revision controller 50 instructs the command manager 42 to resume processing.

The revision controller 50 provides the pause instruction to the command manager 42 at the timing of starting the synchronization of the cache table (step S11). When the command manager 42 receives the pause instruction, the command manager 42 performs the pause processing (step S12). After completion of the pause processing, the command manager 42 responds with the completion in response to the status confirmation received from the revision controller 50 (step S13). When the revision controller 50 receives the completion response from the command manager 42 or when the first threshold time has elapsed, the revision controller 50 starts the synchronization of the cache table. After completion of the synchronization of the cache table, the revision controller 50 instructs the command manager 42 to resume processing.

Before switching the master CM 10, the revision controller 50 provides the complete stop instruction to the command manager 42 (step S14). When the command manager 42 receives the complete stop instruction, the command manager 42 performs the complete stop processing (step S15). After completion of the complete stop processing, the command manager 42 responds with the completion in response to the status confirmation received from the revision controller 50 (step S16). When the revision controller 50 receives the completion response from the command manager 42 or when the first threshold time has elapsed, the revision controller 50 switches the master CM 10 (step S17). After completion of the switching of the master CM 10, the revision controller 50 instructs the command manager 42 to resume processing. After that, the revision controller 50 revises the IOMs 21 and the FEMs 22 (step S18).

During the firmware active application processing, the revision controller 50 provides the stop instruction to the command manager 42 as described above at the timing at which the configuration control performed using the API is not acceptable. When the command manager 42 receives the stop instruction, the command manager 42 stops the processing after taking measures such that the external software 31 does not detect an abnormality. With this configuration, the revision controller 50 may minimize such a situation that the external software 31 performs the configuration control and detects an abnormality during the firmware active application.

Figure 11B:
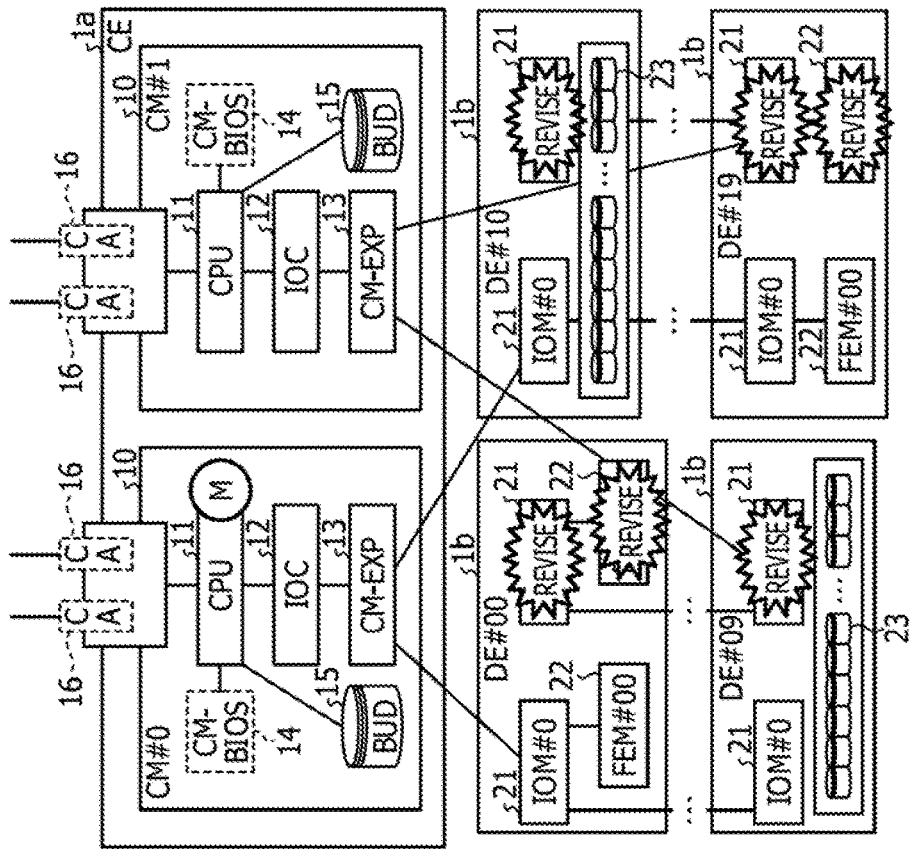
FIGS. 11A and 11B are first diagrams illustrating an operation of firmware active application.
Figure 11A:
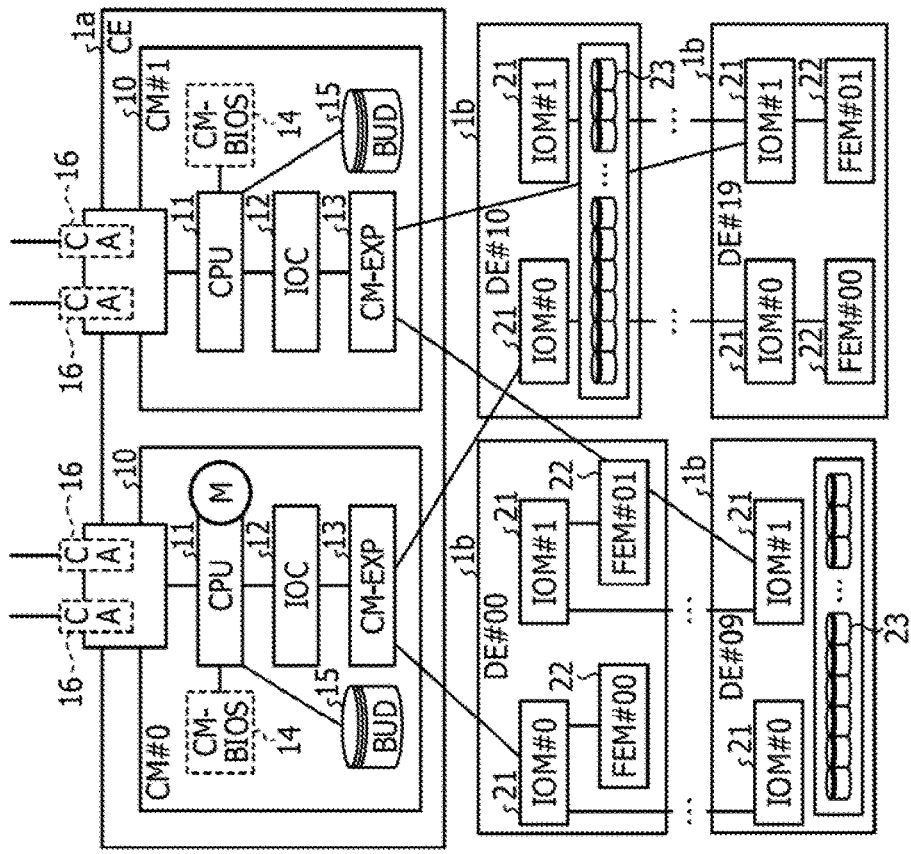

An operation of a firmware active application will be described below with reference to FIGS. 11A to 11H. FIGS. 11A to 11H are diagrams illustrating an operation of a firmware active application. In FIGS. 11A to 11H, "M" surrounded by a circle refers to the master CM 10. FIG. 11A illustrates a state before the firmware active application processing starts. In FIG. 11A, the CM #0, the IOM #0, and the FEM #00 operate as the master.

The revision controller 50 first revises the firmware of the IOM #1 system and the FEM #01 system that do not operate as the master. FIG. 11B illustrates the firmware revision operation of the IOM #1 system and the FEM #01 system. As illustrated in FIG. 11B, the firmware of the IOM #1 system and the FEM #01 system is revised in the DE #00 to the DE #19.

Figure 11D:
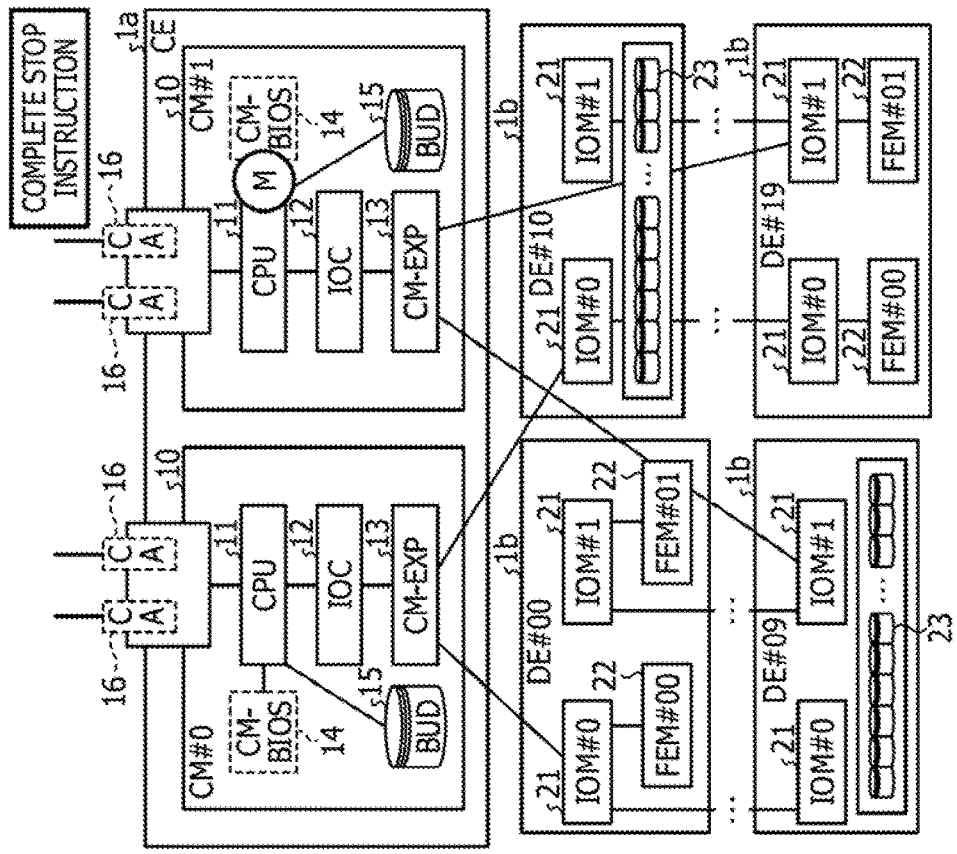
FIGS. 11C and 11D are second diagrams illustrating an operation of firmware active application.
Figure 11C:
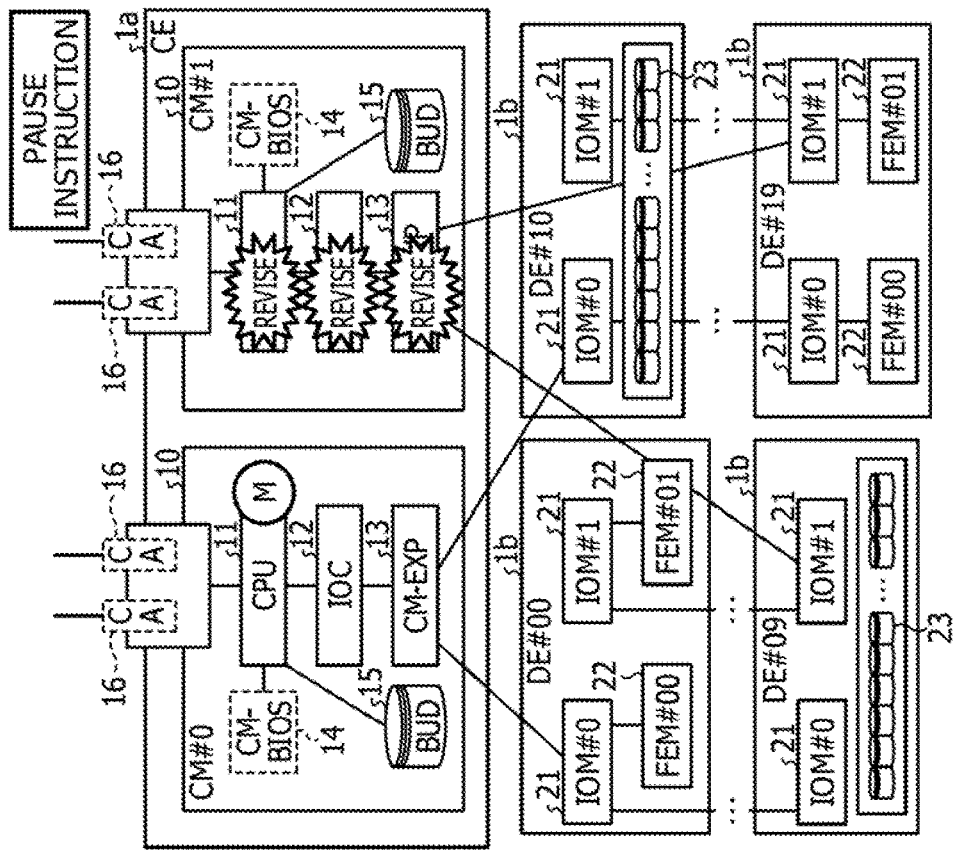

Next, the revision controller 50 revises the firmware of the CM #1. During the firmware revision of the CM #1, the revision controller 50 provides the pause instruction to the command manager 42 at the timing of separating and incorporating the CM #1 and at the timing of synchronizing the cache table. FIG. 11C illustrates the firmware revision operation of the CM #1. As illustrated in FIG. 11C, the revision controller 50 provides the pause instruction at the timing of separating and incorporating the CM #1 and at the timing of synchronizing the cache table during the firmware revision executed by the CPU 11, the IOC 12, and the CM-EXP 13 of the CM #1.

Next, the revision controller 50 switches the master CM 10. The revision controller 50 provides the complete stop instruction to the command manager 42 before switching the master CM 10. FIG. 11D illustrates the operation of switching the master CM 10. As illustrated in FIG. 11D, the master CM 10 is switched from the CM #0 to the CM #1 after the complete stop instruction is provided.

Figure 11E:
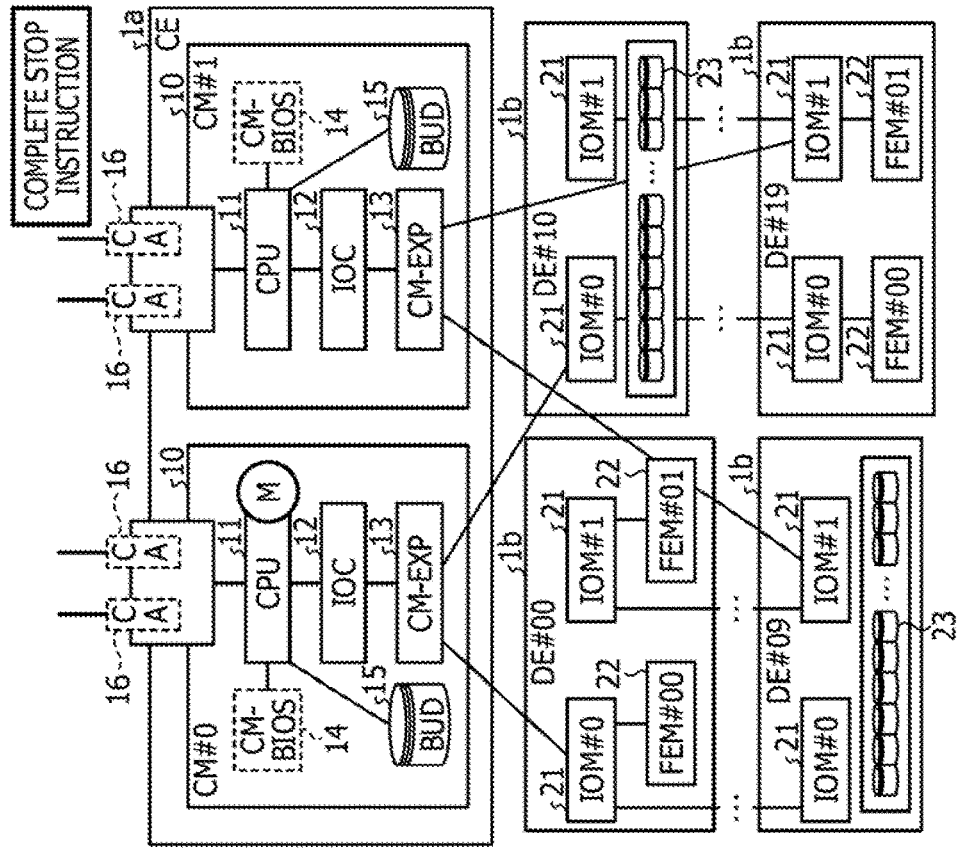
FIGS. 11E and 11F are third diagrams illustrating an operation of firmware active application.

Next, the revision controller 50 revises the firmware of the CM #0. During the firmware revision of the CM #0, the revision controller 50 provides the pause instruction to the command manager 42 at the timing of separating and incorporating the CM #0 and at the timing of synchronizing the cache table. FIG. 11E illustrates the firmware revision operation of the CM #0. As illustrated in FIG. 11E, the revision controller 50 provides the pause instruction at the timing of separating and incorporating the CM #0 and at the timing of synchronizing the cache table during the firmware revision executed by the CPU 11, the IOC 12, and the CM-EXP 13 of the CM #0.

Figure 11F:
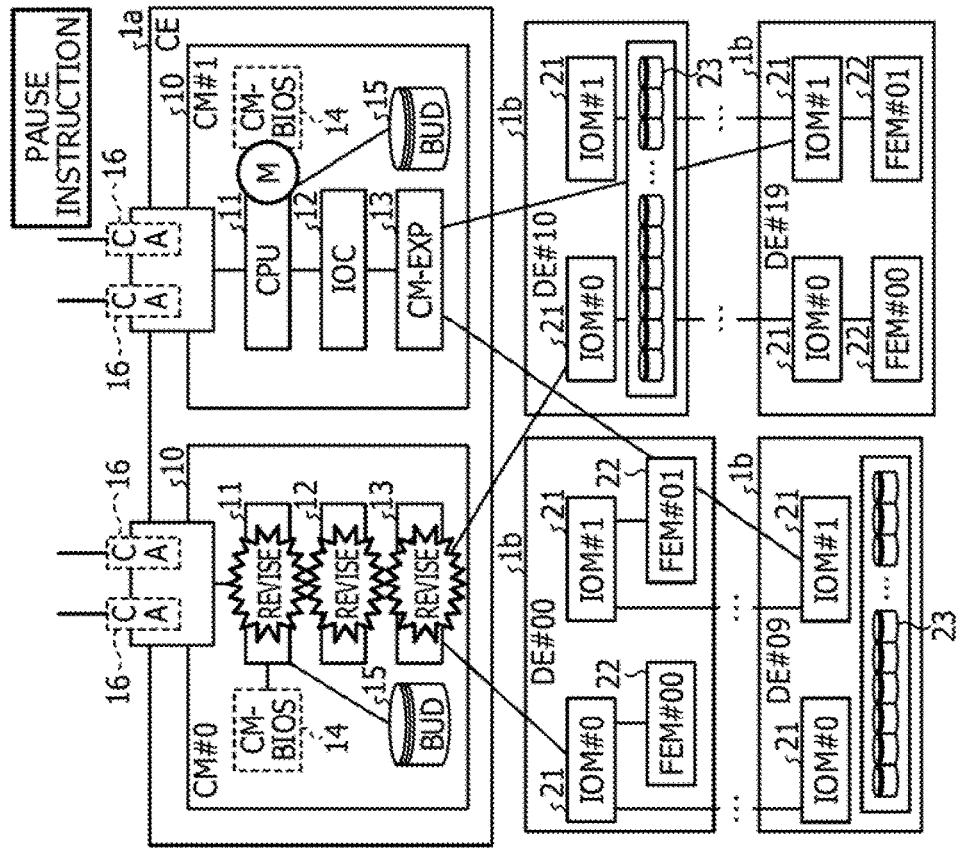

Next, the revision controller 50 switches back the master CM 10. The revision controller 50 provides the complete stop instruction to the command manager 42 before switching back the master CM 10. FIG. 11F illustrates the switchback operation of the master CM 10. As illustrated in FIG. 11F, the master CM 10 is switched back from the CM #1 to the CM #0 after the complete stop instruction is provided.

Figure 11H:
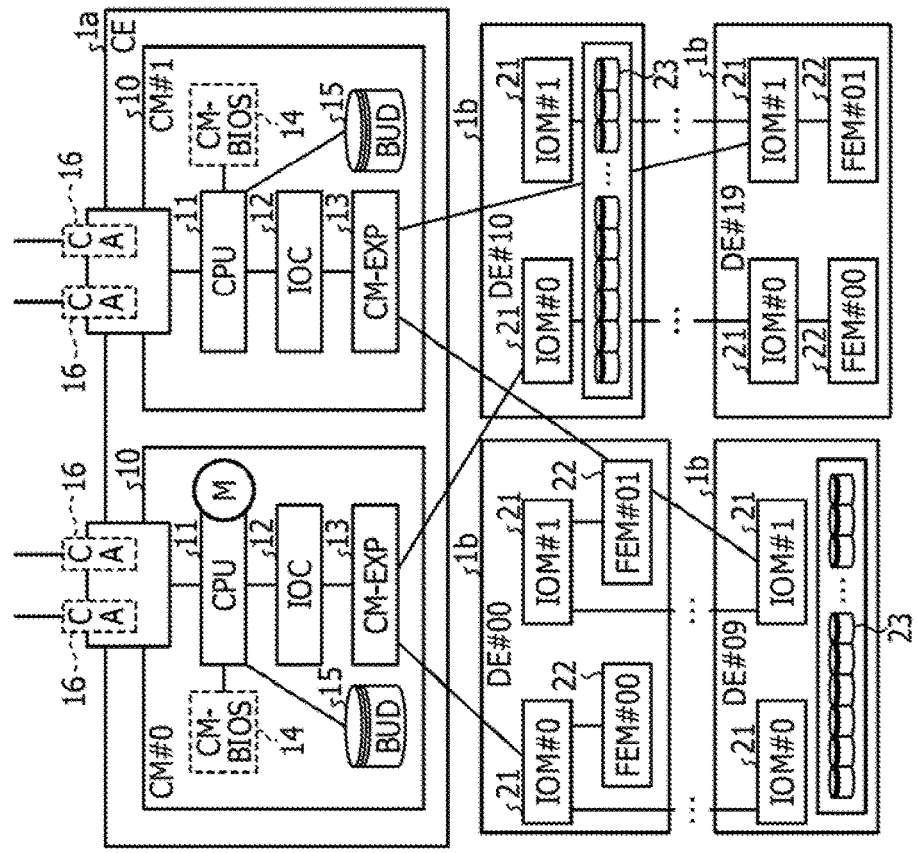
FIGS. 11G and 11H are fourth diagrams illustrating an operation of firmware active application.
Figure 11G:
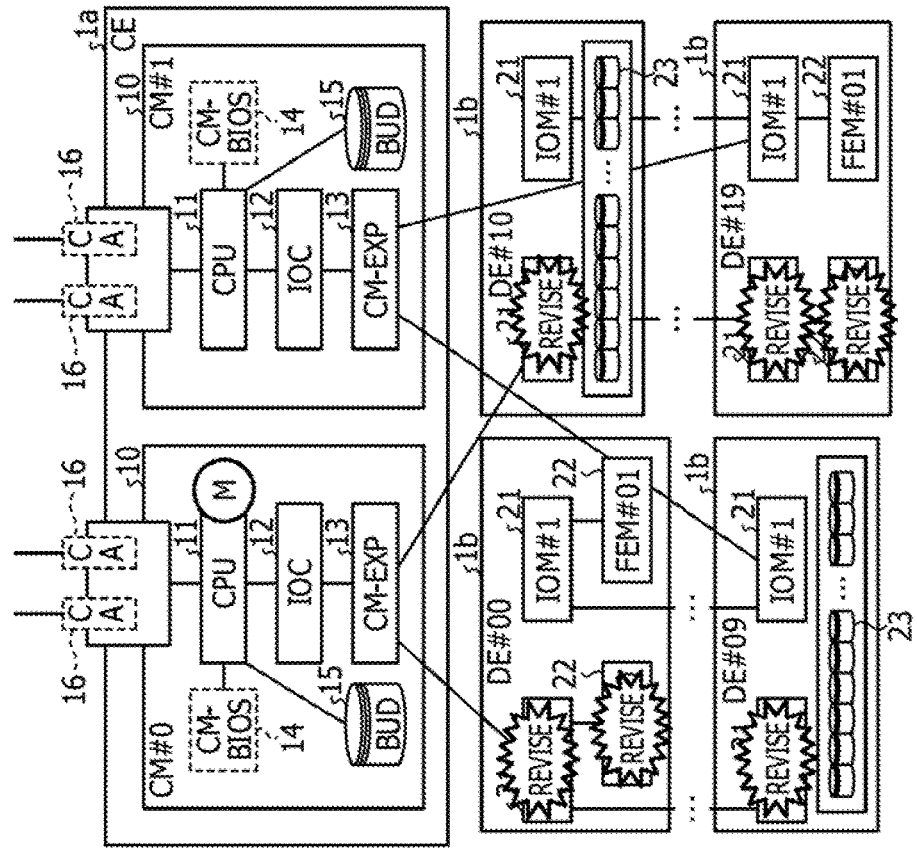

Next, the revision controller 50 revises the firmware of the IOM #0 system and the FEM #00 system that do not operate as the master. FIG. 11G illustrates the firmware revision operation of the IOM #0 system and the FEM #00 system. As illustrated in FIG. 11G, the firmware of the IOM #0 system and the FEM #00 system is revised in the DE #00 to the DE #19.

The revision controller 50 ends the firmware revision. FIG. 11H illustrates a state after completion of the firmware revision. In FIG. 11H, the state of the storage apparatus 1 returns to the state in FIG. 11A, which illustrates the state before the firmware revision.

Figure 12:
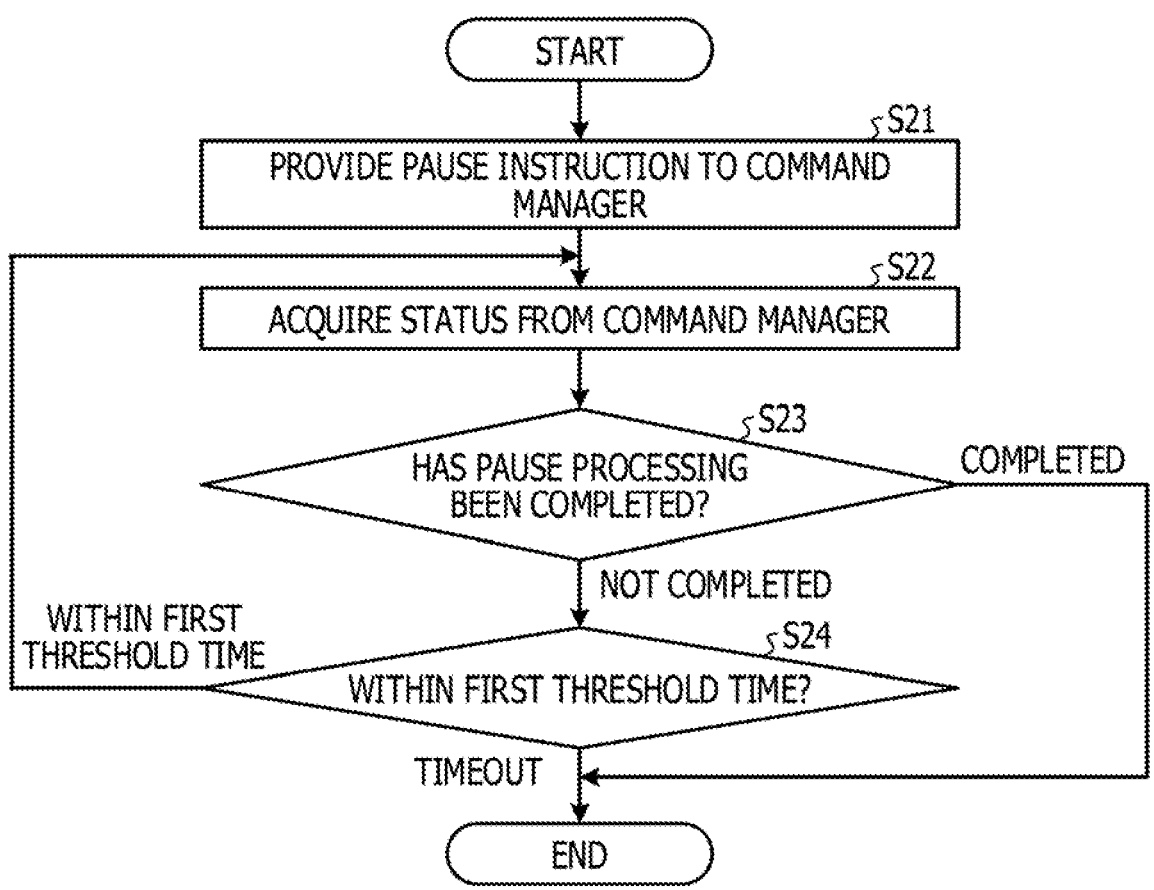
FIG. 12 is a flowchart illustrating a flow of a pause instruction.

A flow of the pause instruction will be described below. FIG. 12 is a flowchart illustrating a flow of a pause instruction. As illustrated in FIG. 12, the revision controller 50 provides the pause instruction to the command manager 42 (step S21). The revision controller 50 inquires of the command manager 42 about the status and acquires the status from the command manager 42 (step S22). On the basis of the acquired status, the revision controller 50 determines whether or not the command manager 42 has completed the pause processing (step S23).

When the command manager 42 has completed the pause processing, the revision controller 50 proceeds to the next processing. When the command manager 42 has not completed the pause processing, the revision controller 50 determines whether or not the first threshold time has elapsed (step S24). When the first threshold time has not elapsed, the revision controller 50 returns to step S22. When the first threshold time has elapsed, the revision controller 50 proceeds to the next processing.

As described above, the revision controller 50 proceeds to the next processing when the command manager 42 does not complete the pause processing within the first threshold time. This configuration may reduce the interruption time during the firmware revision processing. The complete stop instruction is also processed in a flow similar to the flow in FIG. 12.

As described above, in the embodiment, the API provider 32 accepts API execution of the external software 31 and converts the accepted API into CLI commands. The CLI controller 41 generates a command set from an asynchronous command among the CLI commands and passes the command set to the command manager 42. The command manager 42 extracts commands one by one from the command set and requests the command controller 43 for execution. Accordingly, the command controller 43 executes the command. The command controller 43 also controls the firmware revision of the storage apparatus 1 and instructs the command manager 42 to stop the command execution at the timing at which the command execution is not possible during the revision processing. The command manager 42 stops the command execution after performing the processing for suppressing the abnormality detection of the external software 31. With this configuration, the CM 10 may minimize such a situation that the external software 31 detects an abnormality and stops the server 3.

In the embodiment, the command controller 43 provides the pause instruction to the command manager 42 at the timing of separating and incorporating the CM 10 and at the timing of synchronizing the cache table between the CMs 10 during the firmware revision of the CM 10. The command controller 43 provides the complete stop instruction to the command manager 42 at the timing of switching the master CM 10. With this configuration, the command controller 43 may provide the stop instruction at an appropriate timing.

In the embodiment, when the command manager 42 receives the pause instruction, the command manager 42 performs the sweeping processing for a task associated with an API having the timeout requirement and stops the processing. For a task that has no timeout requirement, when the command manager 42 receives the pause instruction and the status of the task remains in the execution state, the command manager 42 stops the processing upon receiving a response to the command being executed. With this configuration, the command manager 42 may minimize such a situation that the external software 31 detects an abnormality due to the timeout of the API execution.

In the embodiment, even for the API that has the timeout requirement, when the command manager 42 receives the pause instruction and does not complete the sweeping processing within the second threshold time with the status of the task remaining in the pre-execution state, the command manager 42 leaves the status of the task in the pre-execution state and stops the processing. With this configuration, the command manager 42 may not cause a significant delay in the firmware revision processing.

In the embodiment, when the command manager 42 receives the complete stop instruction, the command manager 42 performs the sweeping processing and stops the processing regardless of whether or not the API has the timeout requirement. With this configuration, the command controller 43 may switch the master CM 10 while the asynchronous command is not executed.

In the embodiment, even for the API that has the timeout requirement, when the command manager 42 does not complete the sweeping processing within the second threshold time and the status of the task remains in the pre-execution state, the command manager 42 leaves the status of the task in the pre-execution state and stops the processing. With this configuration, the command manager 42 may not cause a significant delay in the firmware revision processing.

Figure 13:
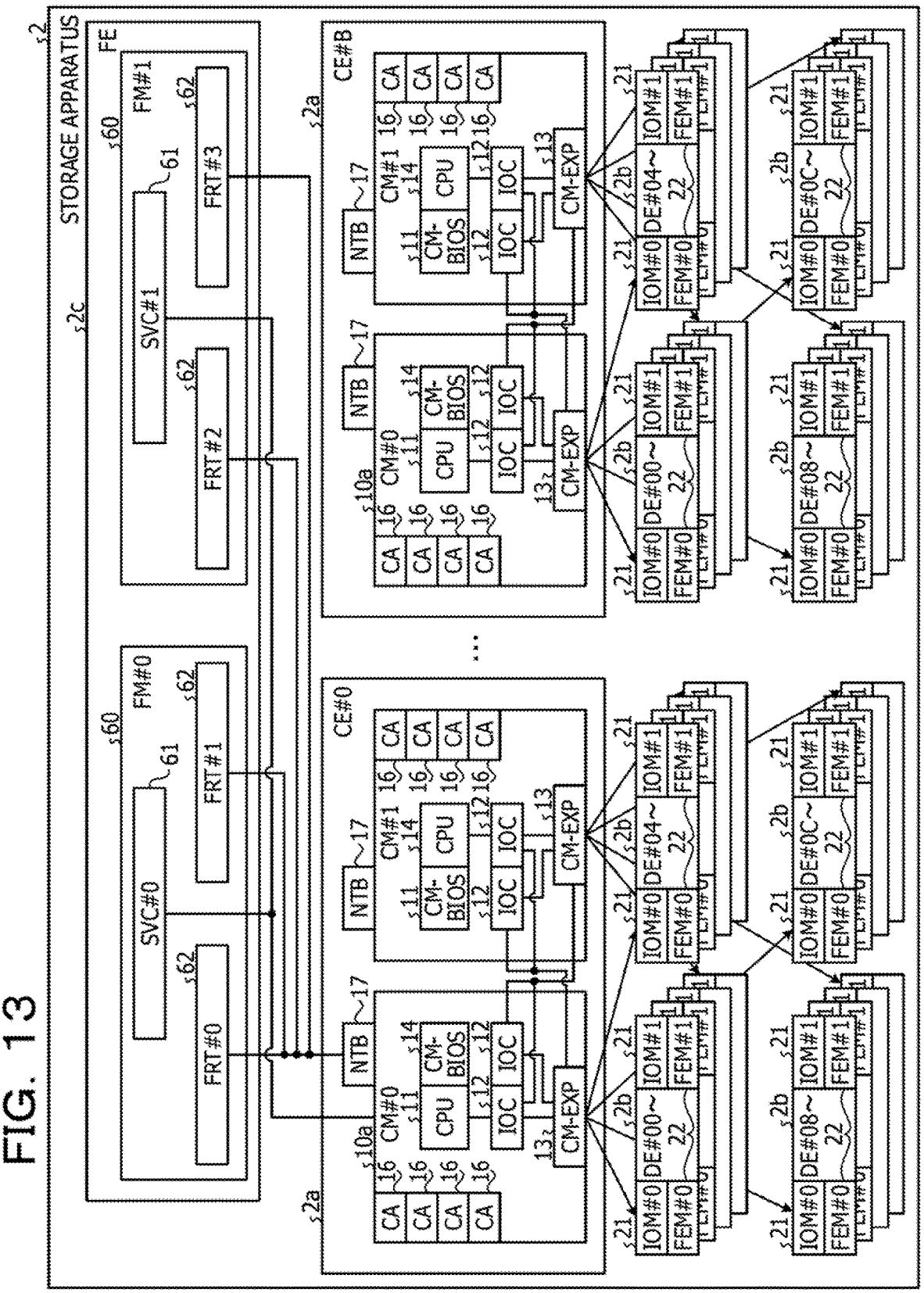
FIG. 13 is a diagram illustrating an example of a configuration of another storage apparatus.

The storage apparatus according to the embodiment may include various configurations other than the configuration illustrated in FIG. 1. An example of a configuration of another storage apparatus will be described below. FIG. 13 is a diagram illustrating an example of a configuration of another storage apparatus. As illustrated in FIG. 13, a storage apparatus 2 includes 12 CEs 2*a* denoted as CE #0 to CE #B, 192 DEs 2*b* denoted as DE #00 to DE #BF, and a front enclosure (FE) 2*c*.

The FE 2*c* is a housing including two front modules (FMs) 60 denoted as FM #0 and FM #1. Each FM 60 manages the CEs 2*a* and relays communication between the CEs 2*a*. The FM #0 includes a service controller (SVC) 61 denoted as SVC #0 and two frontend routers (FRTs) 62 denoted as FRT #0 and FRT #1. The FM #1 includes an SVC 61 denoted as SVC #1 and two FRTs 62 denoted as FRT #2 and FRT #3. Each SVC 61 manages the CEs 2*a* and monitors and controls modules mounted in the CEs 2*a*. Each FRT 62 provides communication paths between the CEs 2*a*.

Each CE 2*a* includes two CMs 10*a* denoted as CM #0 and CM #1. Each CM 10*a* includes a CPU 11, two IOCs 12, a CM-EXP 13, a CM-BIOS 14, four CAs 16, and a non-transparent bridge (NTB) 17. The NTB 17 is an interface coupled with the FRTs 62.

Each DE 2b includes two IOMs 21 denoted as IOM #0 and IOM #1 and two FEMs 22 denoted as FEM #0 and FEM #1.

The storage apparatus 2 may include more or fewer CEs 2a. The storage apparatus 2 may also include more or fewer DEs 2b.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage apparatus comprising:
   a non-volatile storage device configured to store data;
   a memory; and
   a processor coupled to the memory and configured to control access to the non-volatile storage device, the processor configured to:
   receive an instruction from external software as a task,
   generate a command set for controlling the non-volatile storage device
   execute a command included in the generated command set,
   control firmware revision processing of the storage apparatus,
   stop execution of the command after performing processing for suppressing abnormality detection of the external software at a timing at which the command is not executable during the firmware revision processing,
   provide an instruction to pause the execution of the command at a timing of separating and incorporating a corresponding one of a plurality of control devices and at a timing of synchronizing a cache table with another one of the plurality of control devices, and
   provide an instruction to completely stop the execution of the command at a timing of switching the another one of the plurality of control devices to a master control device.

2. The storage apparatus according to claim 1, wherein when a command processing is instructed to pause the execution of the command, the processor is configured to:
   when the instruction from the external software includes a timeout requirement, perform a processing until status of the task becomes success or failure and stop the processing, and
   when the instruction from the external software includes no timeout requirement, stop the processing upon receiving a response to the command being executed.

3. The storage apparatus according to claim 2, wherein the processor is configured to, when the executing processing does not complete, within a given time, a processing supposed to be performed until the status of the task becomes success or failure and when the instruction from the external software includes the timeout requirement and the status of the task remains in a pre-execution state, leave the status of the task in the pre-execution state and stop a processing.

4. The storage apparatus according to claim 1, wherein the processor is configured to, when the executing processing is instructed to stop the execution of the command, perform a processing until status of the task becomes success or failure and stop the processing.

5. The storage apparatus according to claim 4, wherein when the executing processing does not complete, within a given time, a processing supposed to be performed until the status of the task becomes success or failure, the processor is configured to,
   when the instruction from the external software includes a timeout requirement and the status of the task remains in a pre-execution state, leave the status of the task in the pre-execution state and stop a processing, and
   when the instruction from the external software includes no timeout requirement and the status of the task remains in an execution state, stop a processing upon receiving a response to the command being executed.

6. A storage control device comprising:
   a memory; and
   a processor coupled to the memory and configured to:
   receive an instruction from external software as a task,
   generate a command set for controlling a non-volatile storage device,
   execute a command included in the generated command set,
   control firmware revision processing of a storage apparatus,
   stop execution of the command after performing processing for suppressing abnormality detection of the external software at a timing at which the command is not executable during the firmware revision processing,
   provide an instruction to pause the execution of the command at a timing of separating and incorporating a corresponding one of a plurality of control devices and at a timing of synchronizing a cache table with another one of the plurality of control devices, and
   provide an instruction to completely stop the execution of the command at a timing of switching the another one of the plurality of control devices to a master control device.

7. A non-transitory computer-readable recording medium having stored therein a program that causes a computer to execute a storage control processing, the processing comprising:
   receiving an instruction from external software as a task;
   generating a command set for controlling a non-volatile storage device;
   executing a command included in the generated command set;
   controlling firmware revision processing of the storage apparatus;
   stopping execution of the command after performing processing for suppressing abnormality detection of the external software at a timing at which the command is not executable during the firmware revision processing;
   providing an instruction to pause the execution of the command at a timing of separating and incorporating a corresponding one of a plurality of control devices and at a timing of synchronizing a cache table with another one of the plurality of control devices; and
   providing an instruction to completely stop the execution of the command at a timing of switching the another one of the plurality of control devices to a master control device.

* * * * *